UNITED STATES PATENT OFFICE 2,478,419

COLORED SMOKE COMPOSITIONS

John W. Orelup, Short Hills, N. J.

No Drawing. Application July 14, 1943,
Serial No. 494,694

5 Claims. (Cl. 52—23)

The present invention relates to improvements in the production of colored smokes used for the purpose of signals, military pyrotechnics and daylight fireworks.

Previous compositions for the production of colored smokes comprise mixtures of inorganic pigments or organic dyestuffs with compositions evolving heat. After ignition of the mixture the vapors of the heated dyestuff are forced through small orifices in the canister in which the compound is packed. These vapors are then condensed by contact with the air, producing a smoke. Various pigments and dyestuffs have been produced for this use, depending upon the color required. Satisfactory compounds for producing certain colors have been found but attempts to produce green smokes have been unsatisfactory.

The object of the present invention is to provide a compound for producing green smokes, or smokes of other colors which may be derived from a green or yellow base.

In order to secure appropriate conditions for the formation of stable smokes, the chemical nature of the dyestuff and its physical properties must be considered, particularly its capability of forming air floated nuclei. Furthermore, for military purposes the color must be clear and distinct, not changing in hue during the burning. Where different colors are used to signal a maneuver no possibility of mistake of shade can be tolerated. It has been attempted to produce green smokes by using mixtures of blues and various yellows such as auramine yellow. These compounds have been unsatisfactory, however, because the smokes produced were dull and were subject to changes in color during burning. Auramine yellow has the serious objection that it is unstable at high temperatures, and also when mixed with oxidizing agents such as are used in the making of smoke producing compounds.

I have found that quinoline yellow base is a most satisfactory ingredient for producing colored smokes, particularly green smokes, and when mixed with proper blue colors produces green smokes which are brighter, more stable and less likely to change in shade during burning than green smokes produced by the use of other yellow colors now in use. It is also useful without modifying colors for the production of yellow smokes. The term "quinoline yellow base" includes quinophthalone and chlorine derivatives thereof. The mixtures are slow burning, so that prolonged smoke formation is secured and the smoke is also of such character as to endure in visible form for a considerable time. The quinoline yellow base may be combined with various colors so as to produce smokes of different hues but is most useful in the production of greens. For this purpose it is combined with a suitable color producing a blue smoke. Various colors may be used for this purpose such as indigo or aryl amino anthraquinones, for example 1,4 ditoluido anthraquinone. I prefer, however, to combine the quinoline yellow base with an alkylated amino anthraquinone, such as described and claimed in my application for Composition for the production of colored smokes, filed July 14, 1943, Serial No. 494,693.

Alkylated amino anthraquinones suitable for mixture with the quinoline yellow base for the production of green smokes include:

Di(1,4) methyl amino anthraquinone
Di(1,4) ethyl amino anthraquinone
Di(1,4) isopropyl amino anthraquinone
Di(1,4) n-propyl amino anthraquinone
Di(1,4) butyl amino anthraquinone
Di(1,4) isobutyl amino anthraquinone
Di(1,4) amyl amino anthraquinone The blue compound which I now prefer and which I have found to yield the clearest green smoke of the longest duration when combined with quinoline yellow base is di(1,4) amyl amino anthraquinone.

Example I

A typical example of a preparation for giving a clear green smoke of long duration visible for great distances is as follows:

| | Parts |
|---|---|
| Di(1,4) amyl amino anthraquinone | 2½ |
| Quinoline yellow base | 2½ |
| Potassium chlorate | 2½ |
| Lactose | 2 |
| Infusorial earth | ½ |

Example II

Another example of a preparation for giving a green smoke is the following:

| | Parts |
|---|---|
| 1,4 ditoluido anthraquinone | 2½ |
| Quinoline yellow base | 2½ |
| Potassium chlorate | 2½ |
| Lactose | 2½ |

Example III

A typical example of a preparation for giving yellow smoke is as follows:

| | Parts |
|---|---|
| Quinoline yellow base | 5 |
| Potassium chlorate | 2½ |
| Lactose | 2½ |

It is to be understood that in lieu of specific substances mentioned in the examples, chemical equivalents thereof may be used within the scope of the invention.

What is claimed is:

1. A composition for the production of colored smokes for signals and the like, and containing in solid admixture a combustible agent and an oxidizing agent which, upon ignition, furnish heat and gases for volatilizing and dispersing the color component, said composition containing in substantial proportion and as the active yellow color component a quinoline yellow base.

2. A composition for the production of green smokes for signals and the like, and containing in solid admixture a combustible agent and an oxidizing agent which, upon ignition, furnish heat and gases for volatilizing and dispersing the color component, said composition containing as the active yellow color component, a quinoline yellow base together with a color producing blue smoke on heating.

3. A composition for the production of green smokes for signals and the like, and containing in solid admixture a combustible agent and an oxidizing agent which, upon ignition, furnish heat and gases for volatilizing and dispersing the color component, said composition containing as the active yellow color component, a quinoline yellow base and as the active blue color component a blue anthraquinone color.

4. A composition according to claim 3 in which the blue color component is di-1,4 amyl amino anthraquinone.

5. A composition according to claim 1 in which the combustible and oxidizing agents are respectively lactose and an alkali metal chlorate.

JOHN W. ORELUP.

REFERENCES CITED

The following references are of record in the file of this patent:

UNITED STATES PATENTS

| Number | Name | Date |
|---|---|---|
| 1,319,329 | Gowdy | Oct. 21, 1919 |
| 1,969,249 | Alleman | Aug. 7, 1934 |
| 2,265,189 | Orelup | Dec. 9, 1941 |

FOREIGN PATENTS

| Number | Country | Date |
|---|---|---|
| 128,986 | Great Britain | July 10, 1919 |
| 361,362 | Great Britain | Nov. 16, 1931 |

OTHER REFERENCES

Colour Index, 1st ed., Jan. 1924, page 201.